United States Patent
Rietman et al.

(10) Patent No.: US 11,381,379 B2
(45) Date of Patent: Jul. 5, 2022

(54) COMPUTATION DEVICE AND METHOD

(71) Applicant: KONINKLIJKE PHILIPS N.V., Eindhoven (NL)

(72) Inventors: Ronald Rietman, Eindhoven (NL); Sebastiaan Jacobus Antonius De Hoogh, Oosterhout (NL)

(73) Assignee: Koninklijke Philips N.V., Eindhoven (NL)

( * ) Notice: Subject to any disclaimer, the term of this patent is extended or adjusted under 35 U.S.C. 154(b) by 229 days.

(21) Appl. No.: 16/761,865

(22) PCT Filed: Oct. 29, 2018

(86) PCT No.: PCT/EP2018/079537
§ 371 (c)(1),
(2) Date: May 6, 2020

(87) PCT Pub. No.: WO2019/091809
PCT Pub. Date: May 16, 2019

(65) Prior Publication Data
US 2020/0266970 A1    Aug. 20, 2020

(30) Foreign Application Priority Data

Nov. 10, 2017   (EP) .................................. 17201106

(51) Int. Cl.
*H04L 9/00*     (2022.01)
*G06F 7/72*     (2006.01)
(Continued)

(52) U.S. Cl.
CPC .............. *H04L 9/002* (2013.01); *G06F 7/723* (2013.01); *G06F 7/764* (2013.01); *H04L 9/0894* (2013.01);
(Continued)

(58) Field of Classification Search
CPC ... H04L 9/002; H04L 9/089; H04L 2209/046; H04L 2209/16; G06F 7/72; G06F 7/764; G06F 2207/7233
See application file for complete search history.

(56) References Cited

U.S. PATENT DOCUMENTS

2009/0086961 A1*  4/2009  Sauzet ................. G06F 7/728
                                                          380/28
2014/0281573 A1*  9/2014  Jaffe .................... H04L 9/003
                                                          713/189

FOREIGN PATENT DOCUMENTS

WO    20170102879 A1    6/2017

OTHER PUBLICATIONS

Claude Carlet et al., "Higher-Order Masking Schemes for S-Boxes", Mar. 19, 2012, International Conference On Simulation, Modeling, and Programming for Autonomous Robots, SIMPAR 2010 (Lecture Notes in Computer Science, Lect Notes Computer), Springer, Berlin, Heidelberg, pp. 366-384 (Year: 2012).*

(Continued)

*Primary Examiner* — Hee K Song

(57) ABSTRACT

Some embodiments are directed to an electronic computation device (100) arranged for obfuscated execution of a multiplication. The device comprises a storage (120) arranged for storing multiple variables used in the execution of an arithmetic operation, a variable (x: y; 2) of the multiple variables being represented as multiple multiplicative shares $(X=(x_0, x_1, \ldots, x_{m-1}); Y=(y_0, y_1, \ldots, y_{m-1}); 20)$, said multiplicative shares being represented in the storage as multiple additive shares $(x_i=(x_{i,0}, x_{i,1}, \ldots, x_{i,n-1}); Yi=(y_i,0, y_{i,1}, \ldots, y_{i,n-1}); 210, 220)$.

20 Claims, 5 Drawing Sheets

(51) Int. Cl.
  *G06F 7/76*    (2006.01)
  *H04L 9/08*    (2006.01)
(52) U.S. Cl.
  CPC ............... *G06F 2207/7233* (2013.01); *H04L 2209/046* (2013.01); *H04L 2209/16* (2013.01)

(56) References Cited

OTHER PUBLICATIONS

Kim et al "Thwarting Side-Channel Analysis Against RSA Cryptosystems With Additive Blinding" Information Sciences 2017 p. 36-49.
Carlet et al Higher Order Masking Schemes for S-Boxes International Conf. on Simulation, Modeling, and Programming for Autonomous Robots, SIMPAR 2010 p. 366-384.
International Search Report From PCT/EP2018/079537 dated Jan. 18, 2019.
Peter L. Montgomery "Speeding the Pollard and Elliptic Curve Methods of Factorization" Mathematics of Computation, vol. 48, Issue 177, Jan. 1987 p. 243-264.

\* cited by examiner

COMPUTATION DEVICE AND METHOD

CROSS-REFERENCE TO PRIOR APPLICATIONS

This application is the U.S. National Phase application under 35 U.S.C. § 371 of International Application No. PCT/EP2018/079537, filed on Oct. 29, 2018, which claims the benefit of EP Patent Application No. EP 17201106.6, filed on Nov. 10, 2017. These applications are hereby incorporated by reference herein.

FIELD OF THE INVENTION

The invention relates to a computation device, a computation method, and a computer readable medium.

BACKGROUND OF THE INVENTION

Cryptographic devices which execute some cryptographic operation are under various types of threats from attackers on those devices. On one level, an attacker may try to attack the cryptographic operation itself. For example, an attacker may try to collect pairs of inputs and outputs, say of an encryption or decryption, or of a signing operation, and try to derive therefrom secret information, e.g., a secret key, such as a secret symmetric key, or a secret asymmetric key, e.g., a so-called private key. Attacks of this type are sometimes referred to as black box attacks, since the attacker does not need to know anything about the implementation of the operation in the cryptographic device.

On a next level, an attacker may try to obtain additional information by running the cryptographic operation on the device and observing the process. In particular, the attacker may collect, what is known as side-channel information. Typical side-channels include the power usage, or the electromagnetic radiation produced by the device while it is running the operation. If side channels have not been taken into account during the design of an operation, then a device is typically vulnerable to side-channel attacks. Side-channel attacks of some kind are known against many types of algorithms. This includes both symmetric algorithms, such as block ciphers, and asymmetric algorithms. Algorithms that are based on arithmetic using mathematical principles are also vulnerable to side-channel attacks, e.g., the RSA based algorithms for decryption or signing, or the Diffie-Hellman key agreement algorithms. Known countermeasures against side-channels reduce the correlation between the operation that is performed and the side-channel. Side-channel based attacks are sometimes referred to as grey-box attacks, since the attacker has some ability to peer into the device that performs the operation. The sophistication of side-channel attacks is every increasing. For example, not only should individual measurement be uncorrelated to secret information, preferably combinations of measurements should also be uncorrelated, etc.

In addition, attacks known from the far end of the scale, the white-box attacks, inspire attackers to more complicated attacks in grey-box settings as well. In a white-box attack, an attacker has full access to the inner workings of the device. There is a fine line though between grey-box and white-box attacks. For example, in some situations the best known attacks in the white-box model, are in fact taken from side-channel analysis.

There is a difficulty in protecting algorithms that are based on arithmetic. Typically, the numbers on which such algorithms act are very large. For example, the RSA algorithm is routinely applied to 2048 or 4096-bit numbers. One approach to protecting such algorithms is to blind, or mask the numbers. For example, instead storing and calculating with the real variable x, one may instead store and calculate with a blinded number x'. Two types masking have been explored in the context of cryptographic algorithms based on arithmetic: multiplicative masking and additive masking. In the former, one takes x'=cx, for some blinding data c, in the second case one takes x'=x+c. Typically, if multiplications are to be performed, then multiplicative masking is more convenient, whereas if additions are needed then additive masking is more convenient. If both types of operations are needed, one has either to re-encode to another type of masking or to perform a correcting calculation after the operation to account for the errors introduced by the masking. Note that multiplicative masking does not work well in case the variables has the value 0. This is generally not a problem, and may be addressed by avoiding the value 0.

For this reason, algorithms which rely on many multiplications, such as the exponentiation in RSA or Diffie-Hellman have typically been protected using multiplicative blinding. There have been attempts though to use additive masking in cryptographic operations which are based on multiplications.

A first example, is given in US 2009/0086961. In this approach a variable A is masked by replacing it by A+kn, wherein k is a random number and n is the modulus of the multiplication. As the modulus will eventually fall out, e.g., through a modular reduction, the masking has no effect on either additions or multiplications. In this case the additive masking is possible by restricting the allowable masking data. Only multiples of the public modulus are allowed to be added in order to mask. This restricts the randomness that can be introduced.

A second example, is given in "Thwarting side-channel analysis against RSA cryptosystems with additive blinding", by HeeSeok Kim. In this example, additive blinding is used to secure an RSA cryptosystem against power analyses. In this type of blinding, two input values A and B are blinded as $A+M_A$, and $B+M_B$, respectively. The article next performs a mathematical analysis to compute conditions on the masking so that the multiplication $(A+M_A)(B+M_B)$ receives a correct and masked outcome. The condition that is imposed is that the inputs are to have a constant ratio, i.e., that $$\frac{B}{A} = c,$$

where c is a constant. As it turns out this restriction can be accommodated if the only calculation that is needed is an exponentiation. Thus in this example, full additive blinding is obtained, but the downside is that only a limited number of multiplications are possible.

SUMMARY OF THE INVENTION

A computation device is proposed which addresses these and other concerns is defined in the claims. The computation device can perform various arithmetic operations on variables, e.g., multiplication and conditional assignments. These operations can in turn be combined into other secure operations, such as a secure exponentiation.

The inventors made several insights which improve the masking of variables, especially for use in obfuscated arithmetic, e.g., to increase resistance against side-channel attacks. First of all, the inventors created an algorithm that correctly computes a multiplication result even if the inputs are masked additively. Rather than replacing a variable by a blinded variable, a variable may be replaced by a set of values. Each individual member of the set may be randomly chosen, however the sum of the set equals the represented value. This is a representation of a number as multiple additive shares. The algorithms can multiply values even if represented as a set of additive shares, and produce as output a number which is itself masked as a set of additive shares. The number of additive shares in the set can be 2, but it can also be more than 2. For example, the number of elements may be 4 or larger, 8 or larger, etc. In fact, a larger number additive shares implies a more tenuous relationship between side-channels and the actual computation. Most of the computation, even when taken in combination, may thus operate on random data. Only the combination of all additive shares has a relationship to the actual represented variable.

However, the inventors found that yet more complicated representation is compatible with arithmetic operations. For example, in an embodiment the computation device encodes variables in two stages. First a variable is encoded as a one or more multiplicative shares. Then the multiplicative shares are individually encoded as multiple additive shares. Only the latter need to be present in a memory of the device. Although the multiplicative shares can be computed from the sets of additive shares that represent them, this is generally not needed. For example, the latter may be done during a decoding step, but for the most part of the computation, e.g., for multiplication, conditional assignment, or exponentiation it is not needed to compute the multiplicative shares.

The number of multiplicative shares is at least one. If only one multiplicative share is used, then the multiplicative share is equal to the number itself. Such an embodiment has the advantage that number can be added as well as multiplied easily. For example, to add two numbers, one may add the additive shares of the two addends component wise. To multiply, an algorithm as disclosed herein may be used. A downside of using only one multiplicative share is that the relationship between shares and the represented number is linear. Moreover using multiple multiplicative shares has the advantage that an attacker has to monitor more values simultaneously.

Thus, in an embodiment the number of multiplicative shares is one. An example of such an embodiment is an electronic computation device arranged for obfuscated execution of a multiplication. The device comprises
 a storage arranged for storing multiple variables used in the execution of an arithmetic operation, a variable of the multiple variables being represented in the storage as multiple additive shares,
 a processor circuit configured to multiply a first variable in the storage with a second variable in the storage to obtain a multiplication result, said multiplying comprising
  computing a convolution of the additive shares representing said first variable and the additive shares representing the second variable,
  storing the resulting multiple additive shares in the storage as a representation in additive shares of the multiplication result.

In an embodiment, the number of multiplicative shares is more than one. An advantage of using more than one multiplicative share is that the relationship between the shares and the represented number is non-linear. This means that side-channel attacks that try to establish a correlation between secret information and multiple measurements are more difficult since the relationship between measurement and secret data is not linear. For example, the number of multiplicative shares may be 2 or more, 4 or more, 8 or more, etc. The total number of shares is the product of the number of multiplicative shares and the number of additive shares. In an embodiment, the total number of shares is at least 3.

Below we will generally assume that more than one multiplicative share is used, but such embodiments are easily adjusted to the situation in which only one multiplicative share is used. The inventors had the insight that on such a representation both multiplication and conditional assignments can be effectively computed. Such a computation neither needs a re-encoding into a different encoding format, nor are corrections needed to correct computations results done on encoded variables. Operating on sets of shares is preferable to protect against side channels, since anything less than perfect knowledge of the shares does not leak information about the information that is being encoded. This property makes the representation particularly suitable for operating on secret information, such as may be done in cryptographic operations. Having multiplications and conditional assignments a secure exponentiation can be performed. The latter can be used to secure cryptographic operations that depend on exponentiations with secret exponents, e.g., RSA decryption, RSA signatures and Diffie-Hellman key agreement in finite fields, e.g., with a prime number of elements.

The computation device is an electronic device. For example, it may be a mobile electronic device, such as a mobile phone. The computation device may be a set-top box, a smart-card, a computer, etc. The computation device and method described herein may be applied in a wide range of practical applications. Such practical applications include communication in which confidentiality or authenticity is protected using cryptographic operations.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code stored on a computer readable medium for performing a method according to the invention when said program product is executed on a computer.

In a preferred embodiment, the computer program comprises computer program code adapted to perform all the steps of a method according to the invention when the computer program is run on a computer. Preferably, the computer program is embodied on a computer readable medium.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1 schematically shows an example of an embodiment of a computation device, FIG. 2 schematically shows an example of an embodiment of a representation of a variable, FIG. 3a schematically shows an example of an embodiment of a multiplication, FIG. 3b schematically shows an example of an embodiment of a conditional assignment, FIG. 4 schematically shows an example of an embodiment of a computation method, FIG. 5a schematically shows a computer readable medium having a writable part comprising a computer program according to an embodiment, FIG. 5b schematically shows a representation of a processor system according to an embodiment.

Figure 1:
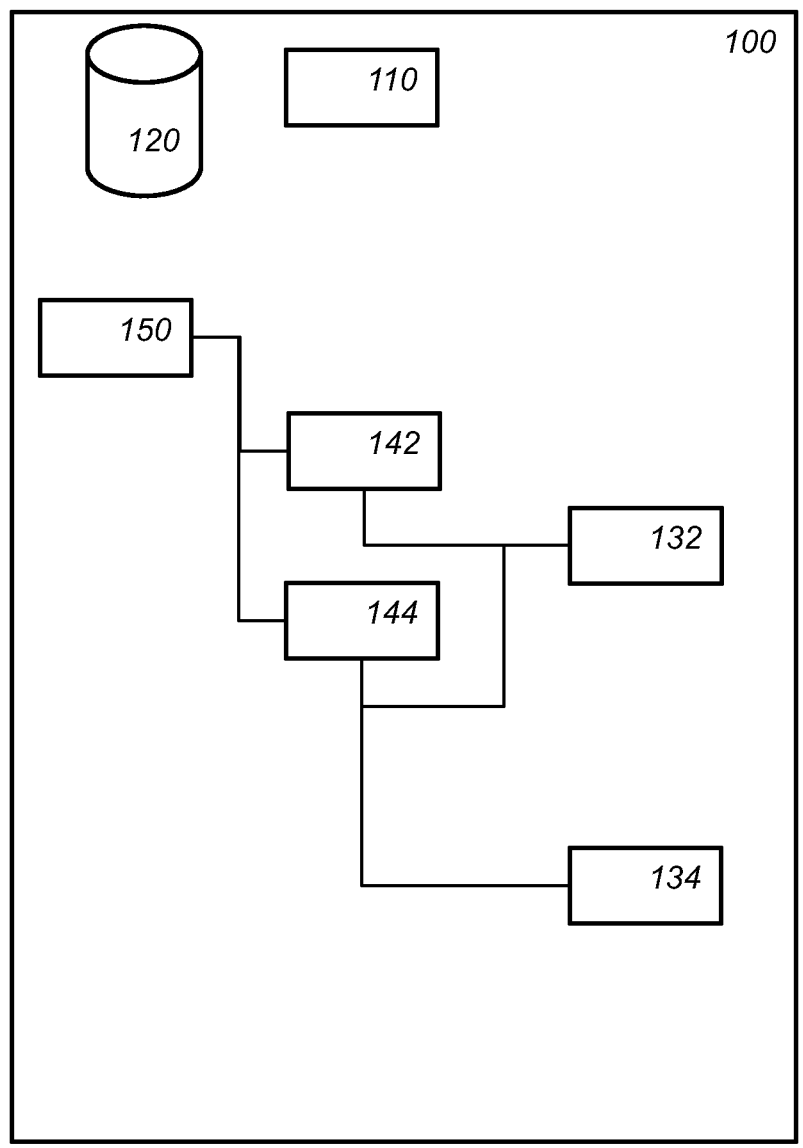

LIST OF REFERENCE NUMERALS IN FIGS. 1-3b, 5a-5b:

100 a computation device
110 a communication interface
120 a storage
132 a convolution unit
134 an addition unit
142 a multiplication unit
144 a conditional assignment unit
150 an exponentiation unit
2 a number
20 multiple multiplicative shares
21-22 a multiplicative share
210, 220 multiple additive shares
211-213, 221-223 an additive share
30, 40 multiple multiplicative shares
31-33, 41-43 a set of additive shares
51, 52 a selection number represented as multiple additive shares
350, 351, 352 a convolution unit
353 an addition unit
1000 a computer readable medium
1010 a writable part
1020 a computer program
1110 integrated circuit(s)
1120 a processing unit
1122 a memory
1124 a dedicated integrated circuit
1126 a communication element
1130 an interconnect
1140 a processor system

DETAILED DESCRIPTION OF THE EMBODIMENTS

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

FIG. 1 schematically shows an example of an embodiment of a computation device 100. The computation device is arranged for the obfuscated execution of a multiplication. The multiplication is executed on a representation using multiple shares so that it is hard for an attacker to analyze the multiplication. In particular, it is hard to analyze the multiplication from a side channel. For example, the computation device is particularly suitable for operations that operate on secret information, which should be protected from attack. For example, the device is suitable for cryptographic operations, especially cryptographic operations which use secret information, such as a secret key. Particular examples of such a cryptographic operation are RSA decryption operation, RSA signature operation, and Diffie-Hellman key agreement. These operations comprise an exponentiation which uses a secret input; in this case a secret exponent.

The inventors have realized that a particular representation of the variables involved in the multiplication is particularly advantageous. The representation combines two different types of obfuscated representation to achieve additional advantages. In particular, the representation allows efficient computation of multiplications and of conditional assignments. More in particular, the representation does not require the re-encoding of variables from one representation to another, or the computation of compensating data to correct the effect of operating on obfuscated representation, rather than on a regular representation.

In general, the computations indicated herein will be modulo some modulus, e.g., depending on the variables being modulo some number, e.g., as is required in RSA exponentiation operations. For example, modulo operations may be inserted at suitable points to avoid number becoming too large, e.g., after each multiplication, etc. It is not necessary that each integer is kept below the modulus at all times. For example, an embodiment may employ so-called pseudo-residues which are only occasionally reduced modulo the modulus. The modulus may, e.g., be a prime number p, or a composite number, e.g., a product of two primes pq.

Computation device 100 comprises storage 120 which comprises variables on which computation device 100 operates in encoded form. A number x, e.g., an integer, e.g., an integer modulo a modulus is initially represented as multiple multiplicative shares $X=(x_0, x_1, \ldots, x_{m-1})$. That is the product of the numbers $x_i$ equals the number x being represented. We will denote sequence of multiple numbers, e.g., tuples, with capital letters, and particular numbers with small case letters. We will refer to the number $x_i$ as multiplicative shares. Note that the multiplicative shares will typically not be stored in storage 120, and in fact will typically not be present at all in storage 120—possibly with some temporary exceptions, e.g., during encoding or decoding of a variable to or from the special representation herein defined. In other words, in an embodiment, an attacker performing, say, a memory scraping attack on device 100, in which the memory is combed to find variables relating to the operation, will not find the multiplicative shares themselves. Instead, the multiplicative shares are represented themselves as additive shares. For example, the multiplicative share $x_i$ may be represented in storage 120, e.g., in a memory of device 100, as multiple additive shares, e.g., as a tuple $X_i=(x_{i,0}, x_{i,1}, \ldots, x_{i,n-1})$. Assuming that a number is represented using m multiplicative shares, which are each represented as n additive shares, the number may thus be represented as nm shares. Representation as shares is desirable since even perfect knowledge of any number of the shares, except all shares, does not reveal any information about the underlying number.

Figure 2:
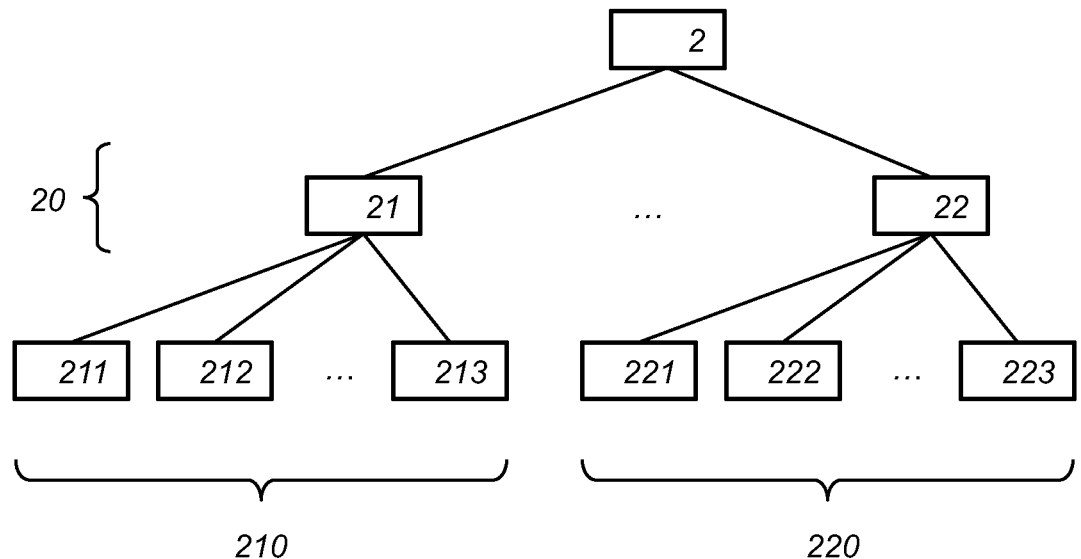

FIG. 2 schematically shows an example of an embodiment of a representation of a variable 2. For example, assume the number 2 is the number 94 modulo the prime 113. This number is first represented as multiple multiplicative shares 20. FIG. 2 shows the multiplicative shares 21 and 22, but there may be more. For example, the multiplicative shares may be the numbers: 55, 40, and 70, since their product modulo 113 is 94. Generating a multiplicative representation of an integer can be done by generating m−1 random non-zero numbers, e.g., modulo the modulus, and computing the final one so that the product of all multiplicative shares equals the number being represented, e.g., number 2. Note that none of the multiplicative shares 20, are present as such in storage 120. Each of the multiplicative shares is further represented using additive shares. FIG. 2 shows that multiplicative share 21 is represented with multiple additive shares 210, e.g., as at least three additive shares: 211, 212 and 213; and multiplicative share 22 is represented as multiple additive shares 210, e.g., as at least three additive shares: 221, 222 and 223. There may be 2 or more than 3 additive shares. In general, numbers which are to be multiplied with each other are represented using an equal number of multiplicative and an equal number of additive shares. The number of additive shares per multiplicative share might differ though. For example, in an embodiment, a first multiplicative share is represented with a first number of additive shares, and a second multiplicative share is represented with a second number of additive shares. The first and second number are preferably larger than 1. Typically, the first and second number are equal but this is not necessary as they may be unequal. In an embodiment, the additive shares, e.g., additive shares 210 and 220, may be stored in storage 120.

For example, the numbers: 55, 40, and 70 may be represented as the tuples (78, 105, 98), (34, 40, 79), (12, 81, 90), since their sums are 55, 40, and 70 respectively modulo 113. In an embodiment, the number 94 modulo 113 may thus be represented as the sequence 78, 105, 98, 34, 40, 79, 12, 81, 90. Further obfuscation techniques may be further applied to this sequence. For example, the sequence need not be stored in this particular order, but may be permuted or scattered throughout storage 120. For example, the additive shares may be encoded.

Returning to FIG. 1. Computation device 100 may comprise a communication interface 110. For example, the communication interface 110 may be arranged to obtain at least one of the variables in storage 120, or at least an initial value thereof. For example, the communication interface 110 may be arranged to receive an encrypted message, e.g., encrypted with RSA, or for receiving a message for signing, e.g., with RSA signing. For example, RSA decryption or signing as defined in RFC 3447 may be used. For example, the communication interface 110 may be arranged to receive a public key for us in a Diffie-Hellman protocol, e.g., as defined in RFC 2631. In each of these three examples, an exponentiation is performed with an exponent that (at least in part) is secret.

The communication interface 110 may be arranged to communicate with other devices over a computer network. The computer network may be an internet, an intranet, a LAN, a WLAN, etc. The computer network may be the Internet. The computer network may be wholly or partly wired, and/or wholly or partly wireless. For example, the computer network may comprise Ethernet connections. For example, the computer network may comprise wireless connections, such as Wi-Fi, ZigBee, and the like. The connection interface may be arranged to communicate with other devices as needed. For example, the connection interface may comprise a connector, e.g., a wired connector, e.g., an Ethernet connector, or a wireless connector, e.g., an antenna, e.g., a Wi-Fi, 4G or 5G antenna. Communication interface 110 may be used to receive transactions to operate upon, or for receiving secret information, e.g., secret keys. Messages may be digital messages, e.g., received in electronic form.

Computation device 100 may comprise various units, e.g., one or more of a convolution unit 132, an addition unit 134, a multiplication unit 142, a conditional assignment unit 144, and an exponentiation unit 150. If, e.g., exponentiation is not needed, then exponentiation unit 150 may be omitted, etc. If no conditional assignment is needed, then, addition unit 134 and conditional assignment unit 144 may be omitted, etc.

The execution of the computation device, e.g., of an embodiment of a computation method may be implemented in one or more processor circuits, examples of which are shown herein. FIG. 1 shows functional units that may be functional units of the processor circuit. For example, FIG. 1 may be used as a blueprint of a possible functional organization of the processor circuit. The processor circuit is not shown separate from the units in FIG. 1. For example, the functional units shown in FIG. 1 may be wholly or partially implemented in computer instructions that are stored at device 100, e.g., in an electronic memory of device 100, and are executable by a microprocessor of device 100. In hybrid embodiments, functional units are implemented partially in hardware, e.g., as coprocessors, e.g., arithmetic coprocessors, and partially in software stored and executed on device 100.

The inventors had the insight that numbers represented as indicated above can be multiplied using convolutions. To this end, one or more convolution units 132 are arranged to convolute two sets of multiple additive shares, e.g., that together represent one multiplicative share.

Multiplicative unit 142 may be arranged to multiply a first variable in the storage with a second variable in the storage. For example, the first variable may be the number x represented as multiple multiplicative shares $X=(x_0,x_1, \ldots, x_{m-1})$, which in turn are represented in the storage as multiple additive shares $X_i=(x_{i,0},x_{i,1}, \ldots, x_{i,n-1})$, with $0 \leq x < m$. For example, the second variable may be the number y represented as multiple multiplicative shares $Y=(y_0,y_1, \ldots, y_{m-1})$, said multiplicative shares being represented in the storage as multiple additive shares $Y_i=(y_{i,0},y_{i,1}, \ldots, y_{i,n-})$, with $0 \leq i < m$.

To obtain a multiplication result $z=xy$, represented as above, the multiplying unit 142 is configured to for each multiplicative share of the first variable,
computing a convolution ($Z_i=X_i*Y_i$) of the additive shares representing said multiplicative share of the first variable ($X_i$) and the additive shares representing the corresponding multiplicative shares of the second variable ($Y_i$),
storing the resulting multiple additive shares ($z_i$) in the storage as a representation in additive shares of a multiplicative share of the multiplication result (z). In other words, each multiple of additive shares $X_i$ corresponds to a multiple of additive shares $Y_i$. Corresponding multiples of additive shares are convoluted to obtain a representation of the multiplication result. In other words, one may regard the variable z to be represented as multiple multiplicative shares $Z=(z_0, z_1, \ldots, z_{m-1})$, which in turn are represented in the storage as multiple additive shares $Z_i=(z_{i,0}, z_{i,1}, \ldots, z_{i,n-1})$, with $0 \leq i < m$. Further details of multiplying by convolution are given below.

Figure 3A:
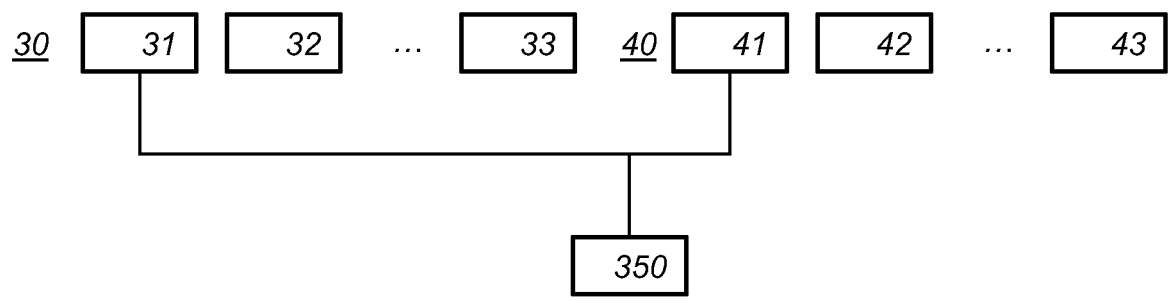

FIG. 3a schematically shows an example of an embodiment of a multiplication. Shown in FIG. 3a are two numbers. The first is represented by multiple multiplicative shares 30. The second by multiple multiplicative shares 40. Each multiplicative share is represented by a set of additive shares. In FIG. 3a, each of the references 31-33, and 41-43 denotes a set of additive shares. In this case 3 multiplicative shares are shown, but two or more than 3 is also possible. The number of shares in the additive sets is not shown, but this could be two or more.

FIG. 3a also shows a convolution unit 350. At the moment shown in FIG. 3a, convolution unit 350 performs a convolution between an additive set of the first number, e.g., set 31, and an additive set of the second number, e.g., set 41. After this convolution, convolution unit 350 may perform a convolution between sets 32 and 42. There is no reason that a share in a first set of additive shares needs to correspond to the share in a second set of additive shares which has the same index, so long the correspondence relation forms a bijection between the shares. For example, convolution unit 350 may also convolute 31 with 42, 32 with 43 and 33 with 41, etc. The convolutions can well be parallelized, e.g., 31 may be convoluted with 41, at the same time that 32 is convoluted with 42, etc.

Returning to FIG. 1. In an embodiment, computation device 100 may comprise a conditional assignment unit 144. In addition to the convolution unit 132, the conditional assignment unit 144 in this embodiment also uses an addition unit 134. Addition unit 134 is configured to add two sets of additive shares, for example, by adding corresponding elements to each other. By adding two additive sets, one obtains an additive representation of the sum. In case only one multiplicative share is used, then addition unit 134 may be used to add two variables in general. In case more than one multiplicative share is used, more care is needed. However, if needed a so-called circuit may be used to add numbers having multiple multiplicative shares.

Conditional assignment unit 144 takes input two variables, say, a first variable x and a second variable y, and a binary condition d. One may take for d a regular binary variable having the values 0 or 1. The operations which depend on d could be integrated with the computer program code which computed the condition d. Furthermore, the variable d could be obfuscated, e.g., encoded. Conditional assignment unit 144 either assigns the first variable to its output, e.g., to a third variable z, or assigns the second variable to its output, depending on the condition d. In an embodiment, the conditional assignment unit 144 uses two selection numbers to do this, e.g., R and R'. The selection numbers may be constants and may be stored in storage 120, or may be hardcoded in the unit 144, etc. The selection numbers are represented as a set of additive shares. A representation using multiplicative shares as well as additive shares is possible for the selection numbers, but it is not needed. However, using multiple multiplicative shares for the selection numbers may require an addition circuit, which is preferably avoided. The conditional assignment unit is configured to for each multiplicative share of the first variable,
computing a first convolution $R*X_i$ of a first selection number R and the additive shares representing the multiplicative share of the first variable $X_i$,
computing a second convolution $R'*Y_i$ of a second selection number R' and the additive shares representing the corresponding multiplicative share of the second variable $Y_i$,
adding the results of the first and second convolution $Z_i = R*X_i + R'*Y_i$, and storing the resulting multiple additive shares $Z_i$ in the storage as a representation in additive shares of a multiplicative share of the assignment result z.

Which selection numbers are used, depends on the conditional d. For example, if storage 120 stores two selection numbers $R_1$ and $R_2$, then the unit 144 may set $R=R_1$, $R'=R_2$ if d is true, e.g., d=1, and $R=R_2$, $R'=R_1$ if d is false, e.g., d=0. In an embodiment, the selection numbers are additive representations of either 0 or 1. For example, one of the selection numbers may be an additive representation of 0 or 1, while the other selection number represents the other of 0 and 1.

Figure 3B:
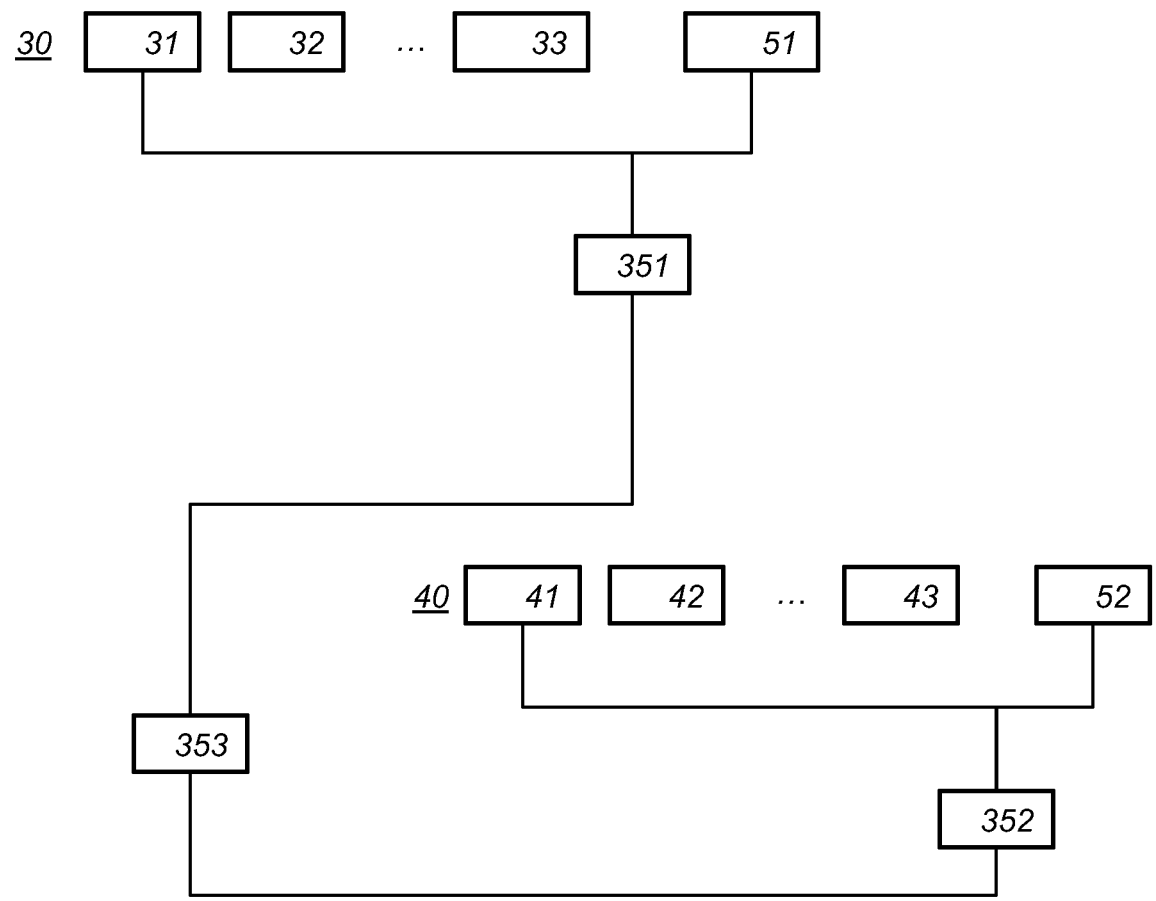

FIG. 3b schematically shows an example of an embodiment of a conditional assignment unit 144. Shown are two numbers represented as multiple multiplicative shares 30 and 40. Each multiplicative share is represented by a set of additive shares. In FIG. 3b each of the references 31-33, 41-43 represents a set of additive shares. Two selection numbers are shown, represented by additive share sets 51 and 52. A first convolution unit 351 is shown convolution set 31 with selection number 51. A second convolution unit 352 is shown convoluting set 41 with selection number 52. The result of units 351 and 352 are added by addition unit 353. The result is one element of the assignment result. After this iteration, sets 32 and 51, sets 42 and 52 are convoluted and the results added.

It is not needed that each iteration uses the same selection numbers, different numbers may be used instead. In particular, different representations that represent the same value, for example, the value 0 may be used in each iteration, but represented each time, or some time as with a different representation. It is also not needed that the computations are performed in the order indicated herein. Both the multiplication and assignment are highly parallel. This may be exploited in embodiments by permuting the order of the calculations, e.g., depending on a random variable, as a further obfuscation step. Randomization helps against averaging attacks. Note that the selection numbers could be generated randomly before an operation, before an assignment, or even before each or some iterations.

Both multiplication and assignment may be further obfuscated by adding dummy operations. For example, a suitable dummy operation is to do a multiplication with a representation of the number 1. For example, a suitable dummy operation is to add an additive representation of the number 0, to one or more additive share sets. Including one or more dummy operations will randomize the timing between iterations, and/or between different calls of the operation. Especially, if the dummy operations are inserted in dependence on a random process, e.g., a call to a random number generator. Randomized timing thwarts averaging attacks, moreover if the dummy operations are alike to regular operations as above, re-syncing by the attacker is hard.

Note that the obfuscated multiplication, e.g., using multiplication unit 142 and the obfuscated assignment, e.g., using assignment unit 144, can operate on numbers in the same representation. No re-encoding to move from the unit 142 to 144 or vice versa is needed. This means that these operations can be stringed together with ease. For example, in an embodiment, an operation, e.g., a cryptographic operation comprises a conditional assignment followed by a multiplication with the conditional assignment result. For example, in an embodiment, an operation, e.g., a cryptographic operation comprises conditional assignment followed by a multiplication with the assignment result. In an embodiment, an exponentiation comprises repeated obfuscated multiplications.

An even better obfuscated exponentiation can be obtained by also using obfuscated assignments. For example, exponentiation operations can be effectively performed using multiplication and conditional assignments. For example, the exponentiation may comprise repeated multiplications, wherein the multiplications depend on bits in an exponent. A conditional assignment is executed in dependency on the bits in the exponent followed by a multiplication. For example, to effectively perform the exponentiation, a so-called Montgomery ladder may be used.

The Montgomery ladder may be implemented according to:

```
s ← 1
t ← h
For i = λ−1 to 0 do
    u ← (1−d_i)s + d_i t mod N (I)
    s ← su mod N (II)
    t ← tu mod N (II)
End for,
``` wherein h represents the base of the exponentiation, and the bits $d_i$ represent bits of the exponent, the conditinoal assignments (I) and the multiplications (II) being obfuscated as in an embodiment. Note that an exponentiation algorithm that uses an obfuscated assignment, and includes an equal number of multiplications in each iteration has increased resistance against side channel attacks, since it is hard to determine the exponent from either the assignment, nor from the multiplications. The above Montgomery ladder has this property since both the assignment and the multiplications are protected by shares. Furthermore, the multiplications are independent from the secret exponent bits.

If the number of multiplicative shares, and/or the number of additive shares is large then the exponentiation, which is already an expensive operation can become quite expensive indeed. This can be avoided by performing a protected exponentiation with a smaller protected exponent, and a regular exponentiation with an unprotected exponent. The protected exponent, and the unprotected exponent can be chosen such that their combined result equals exponentiation with the intended exponent, in case of RSA, with the secret exponent, e.g., the secret key. For example, in an embodiment, the exponentiation unit 150 may be configured to perform an exponentiation by obtaining a first exponent and a second exponent, a first exponent having fewer bits than the second exponent, said subsequent exponentiation by the first and second exponent being equal to exponentiation by the exponent, wherein the exponentiation with the first exponent comprises obfuscated multiplication and/or conditional assignments. For example, the first and second exponents may be chosen during key generation, and stored in device 100, e.g., in storage 120.

In the various embodiments of device 100, the communication interface may be selected from various alternatives. For example, the interface may be a network interface to a local or wide area network, e.g., the Internet, a storage interface to an internal or external data storage, a keyboard, an application interface (API), etc.

The device 100 may have a user interface, which may include well-known elements such as one or more buttons, a keyboard, display, touch screen, etc. The user interface may be arranged for accommodating user interaction for performing a computation, e.g., a cryptographic operation, e.g., a decrypt or sign operation.

Storage 120 may be implemented as an electronic memory, say a flash memory, or magnetic memory, say hard disk or the like. Storage 120 may comprise multiple discrete memories together making up storage 110. Storage 120 may also be a temporary memory, say a RAM. In the case of a temporary storage 120, storage 120 contains some means to obtain data before use, say by obtaining them over an optional network connection (not shown).

Typically, the device 100 comprises a microprocessor (not separately shown) which executes appropriate software stored at the device 100; for example, that software may have been downloaded and/or stored in a corresponding memory, e.g., a volatile memory such as RAM or a non-volatile memory such as Flash (not separately shown). Alternatively, the device 100 may, in whole or in part, be implemented in programmable logic, e.g., as field-programmable gate array (FPGA). Device 100 may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

In an embodiment, the computation device comprises one, or more, or all of a convolution circuit, an addition circuit, a multiplication circuit, a conditional assignment circuit, an exponentiation circuit, a communication interface circuit. The circuits implement the corresponding units described herein. The circuits may be a processor circuit and storage circuit, the processor circuit executing instructions represented electronically in the storage circuits.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only.

Thus, a device and method are disclosed to perform modular exponentiation with a secret exponent with increased resistance against leaking the exponent through a side channel. Embodiments combine, e.g., a Montgomery ladder, multiplicative sharing and additive sharing. Applications include the RSA algorithm, and the DiffieHellman algorithm in $Z^*_p$. In the RSA application, the secret exponent typically is large, e.g., 2048 of 4096 bits. An optimization is shown to reduce the size of the exponent used which greatly speeds up the calculations. Below these and further embodiments are discussed, in a more mathematical language.

1 Terminology and Notation

If a number $x=\Sigma_{i=0}^{n-1}x_i$, then the n numbers $x_0, x_1, K, x_{n-1}$ are an additive n-share representation of x. Notation: $x=A(x_0, x_1, K, x_{n-1})$. If a number $x=\pi_{i=0}^{m-1}x_i$, then the m numbers $x_0, x_1, K, x_{m-1}$ are a multiplicative m-share representation of x. Notation:

$$x=M(x_0, x_1, K, x_{m-1}).$$

If $x=A(x_0, K, x_{n-1})$ and $y=A(y_0, y_1, K, y_{n-1})$, then the per-share addition gives an additive n-share representation of the sum x+y:
$A(x_0+y_0, x_1+y_1, K, x_{n-1}+y_{n-1})=x+y$. If $x=M(x_0, K, x_{m-1})$ and $y=M(y_0, y_1, K, y_{m-1})$, then the per-share multiplication gives a multiplicative m-share representation of the product xy: $M(x_0y_0, x_1y_1, K, x_{n-1}, y_{n-1})=xy$.

Let $X=(x_0, K, x_{n-1})$ and $Y=(y_0, K, y_{n-1})$ be two n-tuples of numbers, then the convolution of X and Y, denoted $X*Y$, is defined as the n-tuple $Z=(z_0, K, z_{n-1})$ where $$z_i = \sum_{j=0}^{n-1} x_j y_{(i-j) \bmod n},$$

for $0 \leq i \leq n-1$. Example for n=3: if $X=(x_0, x_1, x_2)$ and $Y=(y_0, y_1, y_2)$, then $X*Y=(x_0y_0+x_1y_2+x_2y_1, x_0y_1+x_1y_0+x_2y_2, x_0y_2+x_1y_1+x_2y_0)$.

It holds for all X and Y that $A(X*Y)=A(X)A(Y)$. In other words: the convolution of two additive share representations results in an additive share representation of the product. Let $x=M(x_0, K, x_{m-1})$ and $y=M(y_0, K, y_{m-1})$.

It would be advantageous if there existed a linear operation which plays an analogous role for multiplicative share representations: such a hypothetical operation of two multiplicative share representations would result in a multiplicative share representation of the sum, i.e., for all X and Y, the operation, denoted $X \diamond Y$, would satisfy $M(X \diamond Y)=M(X)+M(Y)$. It turns out, that is can be proven through mathematical argument, that such a hypothetical operation cannot exist in general. Nevertheless, even though it is not possible to create multiplicative shares of an arbitrary weighted sum $(1-\alpha)x+\alpha y$ from the multiplicative shares of x and y by taking linear combinations, it is possible when $\alpha=0$ or $\alpha=1$: $z_i=(1-\alpha)x_i+\alpha y_i$ for $0 \leq i \leq m-1$ satisfies $M(z_0, K, z_{m-1})=(1-\alpha)M(x_0, K, x_{m-1})+\alpha M(y_0, K, y_{m-1})$ when $\alpha \in \{0,1\}$.

Note that each share of x and y is multiplied by either zero or one. This can be camouflaged, e.g., in the following way.

1. Construct a number ($K \geq 1$) of additive share sets $O_0, O_1, K, O_{K-1}$ that represent 0, i.e., $O_i=(o_{i,0}, K, o_{i,n-1})$ with $A(o_{i,0}, K, o_{i,n-1})=0$ for $0 \leq i \leq K-1$.

2. Construct a number ($K \geq 1$) of additive share sets $J_0, J_1, K, J_{K-1}$ that represent 1, i.e., $J_i=(j_{i,0}, K, j_{i,n-1})$ with $A(j_{i,0}, K, j_{i,n-1})=1$ for $0 \leq i \leq K-1$.

3. Represent each multiplicative share $x_i$ of x by an additive share set $X_i=(x_{i,0}, K, x_{i,n-1})$, such that $x_i=A(x_{i,0}, K, x_{i,n-1})$.

4. Represent each multiplicative share $y_i$ of y by an additive share set $Y_i=(y_{i,0}, K, y_{i,n-1})$, such that $y_i=A(y_{i,0}, K, y_{i,n-1})$.

5. If $\alpha=0$, calculate an additive share set $Z_i$ of the multiplicative share $z_i$ of z as $Z_i=J_{k_i}*X_i+O_{l_i}*Y_i$, where $k_i$ and $l_i$ are arbitrarily chosen integers satisfying $0 \leq k_i, l_i \leq K-1$.

If $\alpha=1$, $Z_i$ is calculated as $Z_i=O_{k_i}*X_i+J_{l_i}*Y_i$.

The two cases can be summarized in the single equation $Z_i=R(1-d_i)_{k_i}*X_i+R(d_i)_{l_i}*Y_i$, where $R(0)$ stands for O and $R(1)$ stands for J.

2 Exponentiation Using a Montgomery Ladder

In RSA and in the Diffie-Hellman protocol it is often required to perform a modular exponentiation of a 'public' number h and a 'secret' exponent d modulo a public modulus N:

$s=h^d \bmod N$.

For example, In RSA signing, we may have: h is the padded message digest, d is the private key and s is the resulting signature. Let $\lambda$ denote the bit-length of N (and d), and write the binary expansion of d as $d=\sum_{i=0}^{\lambda-1} d_i 2^i$, with $d_i \in \{0,1\}$. A simple algorithm for calculating s is the following:

```
Straightforward exponentiation
    s ← 1
    for i = λ−1 to 0 do
        s ← s² mod N
        if dᵢ = 1 then
            s ← sh mod N
        end if
    end for
```

This algorithm is side-channel sensitive, because the pattern of squarings and multiplications reveals the exponent d. This holds also when the if-statement is unrolled for a given d.

The Montgomery ladder calculates s in the following way:

```
Montgomery ladder
    s ← 1
    t ← h
    for i = λ−1 to 0 do
        if dᵢ = 0 then
            a ← s² mod N
            b ← st mod N
        else
            a ← st mod N
            b ← t² mod N
        end if
        s ← a
        t ← b
    end for
```

The Montgomery ladder offers some protection against side-channel attacks, because in each step both a squaring and a multiplication occur. However, any side channel that allows the attacker to observe whether s or t is squared in each step, still reveals the key.

The same results are obtained with the following variant of the Montgomery ladder:

```
Montgomery ladder, variation
    s ← 1
    t ← h
    for i = λ−1 to 0 do
        u ← (1−dᵢ)s + dᵢt mod N
        s ← su mod N
        t ← tu mod N
    end for
```

This variant of the Montgomery ladder uses multiplications and an addition, but no squarings. A side channel that allows an attacker to observe in each step whether s is multiplied by zero or by one, or, equivalently, whether u=s or u=t, leaks the key.

In order to make it even harder for an attacker to obtain the key from a side-channel attack, we the obfuscation techniques from the first section may be used to make it harder to see whether u=s or u=t, or whether something is multiplied by zero or by one.

The implementer chooses numbers $m \geq 1$ (number of multiplicative shares representing a Montgomery ladder variable) and $n \geq 2$ (number of additive shares of a multiplicative share). A Montgomery ladder variable is thus represented by mn shares. Preferably both m and n are large.

The implementer chooses a set of numbers $\{A_{\mu,\nu}\}_{\mu=0,\nu=0}^{m-1,n-1}$ and $\{B_{\mu,\nu}\}_{\mu=0,\nu=0}^{m-1,n-1}$ such that $$\prod_{\mu=0}^{m-1}\left(\sum_{\nu=0}^{n-1} A_{\mu,\nu}\right) \bmod N = 1 \text{ and}$$

$$\prod_{\mu=0}^{m-1}\left(\sum_{\nu=0}^{n-1} B_{\mu,\nu}\right) \bmod N = h,$$

to initialize the ladder. The ladder works with mn numbers $S_{\mu,\nu}$, $T_{\mu,\nu}$ and $U_{\mu,nu}$, the n shares $(S_{\mu,0}, K, S_{\mu,n-1})$ are denoted $S_\mu$, and similarly for the T and U shares. The numbers $k_{i,\mu}$ and $l_{i,\mu}$, with $0 \le i \le \lambda-1$ and $0 \le \mu \le m-1$ may be arbitrarily chosen integers from [0,K).

Protected Montgomery ladder with multiplicative and additive shares

```
for μ = 0 to m−1 do
  for v = 0 to n−1 do
    S_{μ,v} ← A_{μ,v}
    T_{μ,v} ← B_{μ,v}
  end for
end for
for i = λ−1 to 0 do
  for μ = 0 to m−1 do
    U_μ ← R(1−d_i)_{k_{i,μ}} *S_μ + R(d_i)_{l_{i,μ}} *T_μ mod N
  end for
  for μ = 0 to m−1 do
    S_μ ← S_μ*U_μ mod N
    T_μ ← T_μ*U_μ mod N
  end for
end for
s ← Π_{μ=0}^{m−1}(Σ_{v=0}^{n−1} S_{μ,v}) mod N
```

In an embodiment, the dummy transformations may be performed on the shares that leave the underlying value invariant, e.g., he may choose to apply a random permutation of the n additive shares, or a random permutation of the m multiplicative shares (represented by additive share sets). Preferably, these transformations are chosen during run time, not at compile time. For example, they may be chosen dependent upon the input h. For example, the input h may be used to seed a random number generator.

In some applications, e.g., signing it is primarily the exponent in an exponentiation which is secret, but neither the input nor the output of the algorithms is confidential. In such a case, intermediate results may still be sensitive since they rely on only part of the key, and may thus allow brute forcing of part of the key.

To mask an input variable h as multiple shares one may first compute multiplicative shares, and then represent each of the multiplicative shares as additive shares. For example, in an embodiment, the variable h is used as a seed to a random number generator which in turn generates all multiplicative or additives shares but one, after which the final shares are computed. Alternatively, a set of random multiplicative functions $f_i$ or additive functions $g_i$ may be selected at compile time. The functions satisfy that $\pi f_i(x)=x$ and $\Sigma g_i(x)=x$, in both cases modulo the public modulus. Thus the product or sum of these functions is independent of the input, at least modulo the modulus. The number of functions is equal to the number of multiplicative shares or additive shares per multiplicative share. If there is only one multiplicative share, the multiplicative functions may be omitted. To represent any variable as shares, e.g., the variable h, one may first compute $(f_0(h), f_1(h), \ldots, f_{m-1}(h))$. To represent a multiplicative share s, one may compute $(y_0(s), \ldots, y_{n-1}(s))$.

One may also use this approach in part. For example, the multiplicative shares may be computed on the fly at runtime, e.g., using a random number generator, computing the final share using an inverse algorithm. Each of the multiplicative shares is then mapped to a set of multiple additive shares using a set of additive functions. Note that the additive functions may be different for some or each of the set of additive shares. For example, at compile time all the additive functions but one may be chosen as random polynomials, after which the final polynomial can be computed.

For example, to generate shares one may do the following. Suppose we wish to represent $f(I)$ on input I, then let $r_i(I)$ be functions providing random shares on input I for i= 1 ... n−1 and let $r_n(I)$ be defined as $f(I)-r_1(I) \ldots -r_{n-1}(I)$. Now $x_i=r_i(I)$ gives an additive n-sharing of $f(I)$. Similarly let $R_i(I)$ be functions providing random shares on input I for i= 1 ... n−1 and let $R_n(I)$ be defined as $f(I)/(R_0(I)^* \ldots *R_{n-1}(I))$, then $X_i=R_i(I)$ gives an n-multiplicative sharing of f(I). The functions r and R may be pseudo random functions.

The Montgomery ladder with mn multiplicative and additive shares takes approximately mn times as many operations as the Montgomery ladder without shares. This may be a high price to pay for the extra side-channel security. The following method may reduce the number of operations significantly, without compromising on security. Consider the following:

1. An attacker who can factor N can find the private key d without much additional effort. The best currently known method for factoring N, using the number field sieve, takes asymptotically $$\exp\left(\left(\sqrt[3]{\frac{64}{9}} + o(1)\right)(\ln(N))^{1/3}(\ln(\ln(N)))^{2/3}\right)$$

operations. For $N \approx 2^{2048}$ this translates to roughly 112 bits of security, for $N \approx 2^{4096}$ about 150 bits.

2. Finding d from s, h and N amounts to solving a discrete logarithm problem, for which the best solution methods take asymptotically $O(\sqrt{N})$ operations. This is much more expensive than factoring N.

3. If it is known that the exponent in the discrete logarithm problem is small, say t bits, a brute-force attack takes $O(2^t)$ operations. As long as t is larger than the security level of RSA, factorization of N is the best attack on d.

The secret exponent d may split in a secret part and a public part. For example, choose a random t-bit number $d_s$, the 'secret' part of d, and calculate $d_p = d_s^{-1} d \bmod \varphi(N)$, the λ-bit 'public' part of d. This uses the Euler function $\varphi(N)$ of the modulus N, e.g., obtained from a factorization of N. Here, φ is the Euler function The exponentiation is done in two steps:

$$s = h^d \bmod N = h^{d_s d_p} \bmod N = (h^{d_s} \bmod N)^{d_p} P \bmod N.$$

The inner modular exponentiation with exponent $d_s$ is done using mn multiplicative and additive shares using the protected Montgomery ladder above, the outer modular exponentiation with exponent $d_p$ is done using a less secure Montgomery ladder. The exponent $d_p$ is likely to leak through a side channel, but that does not matter as long as $d_s$ does not leak. Note that since $$(h^{d_s} \bmod N)^{d_p} \bmod N (h^{d_p} \bmod N)^{d_s} \bmod N,$$

the 'inner' and 'outer' modular exponentiations can be swapped.

The total workload for this method is $\lambda+tmn$, compared to $\lambda mn$ for the protected method above: a considerable improvement when $mn>1$ since t is much smaller than $\lambda$. For example, in an embodiment, t is less than $\lambda$. For example, 10 t is less than $\lambda$. For example, t may be less than 256, while $\lambda$ is larger than 2048.

Splitting the secret exponent into a secret part and a public part can be done at the same time key generation is done. These parts of the exponent can be stored in a storage, e.g., a memory of the computation device.

Figure 4:
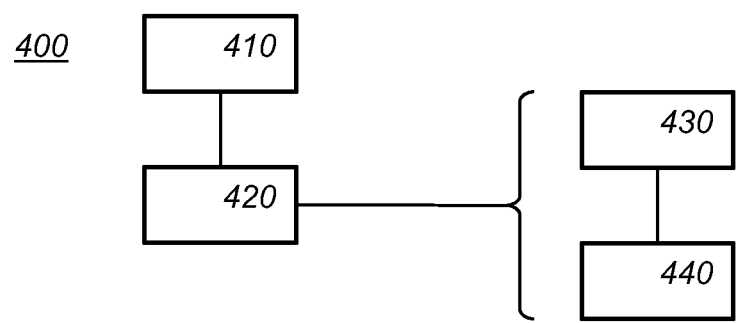

FIG. 4 schematically shows an example of an embodiment of a computation method 400. Computation method 400 is arranged for the obfuscated execution of a multiplication, Method 400 comprises storing 410 multiple variables used in the execution of an arithmetic operation, a variable (x; y; 2) of the multiple variables being represented as multiple multiplicative shares ($X=(x_0, x_1, \ldots, x_{m-1})$; $Y=(y_0, y_1, \ldots, y_{m-1})$; 20), said multiplicative shares being represented in the storage as multiple additive shares ($X_i=(x_{i,0}, x_{i,1}, \ldots, x_{i,n-1})$; $Y_i=(y_{i,0}, y_{i,1}, \ldots, y_{i,n-1})$; 210, 220), and multiplying (420) a first variable in the storage with a second variable in the storage to obtain a multiplication result ($z=xy$).

The multiplying comprises for each multiplicative share of the first variable, computing 430 a convolution ($Z_i=X_i*Y_i$) of the additive shares representing said multiplicative share of the first variable ($X_i$) and the additive shares representing the corresponding multiplicative shares of the second variable ($Y_i$), storing 440 the resulting multiple additive shares ($Z_i$) in the storage as a representation in additive shares of a multiplicative share of the multiplication result (z). Thus operations 430 and 440 are repeated, e.g., iterated as often as necessary, e.g., as often as in the representation of the numbers in the storage.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, operations 430 and 440 may be executed, at least partially, in parallel. Moreover, a given step may not have finished completely before a next step is started.

A method according to the invention may be executed using software, which comprises instructions for causing a processor system to perform method 400. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. A method according to the invention may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figure 5A:
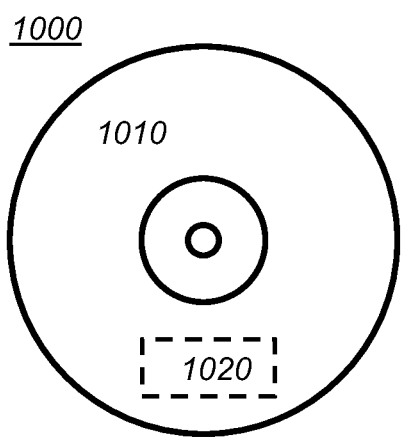

FIG. 5a shows a computer readable medium 1000 having a writable part 1010 comprising a computer program 1020, the computer program 1020 comprising instructions for causing a processor system to perform a computation method, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said computation method.

Figure 5B:
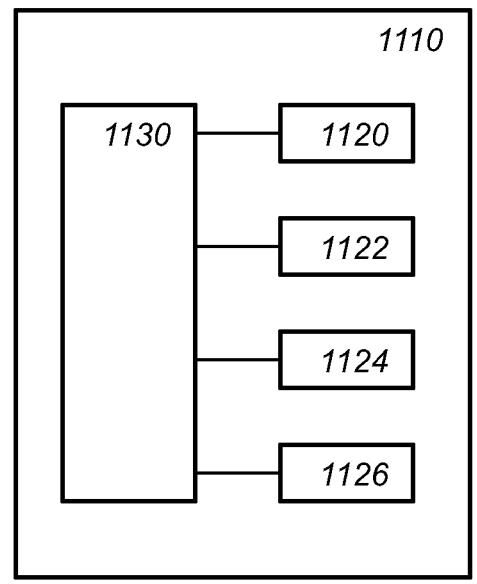

FIG. 5b shows in a schematic representation of a processor system 1140 according to an embodiment of a computation device. The processor system comprises one or more integrated circuits 1110. The architecture of the one or more integrated circuits 1110 is schematically shown in FIG. 5b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, the computation device may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex M0. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb 'comprise' and its conjugations does not exclude the

The invention claimed is:

1. An computation device arranged for obfuscated execution of a multiplication, comprising:
   a memory circuit,
      wherein the memory circuit is arranged to store a plurality of variables,
      wherein each variable (x;y) of the plurality of variables is represented as one or more multiplicative shares ($X=(x_0, x_1, \ldots, x_{m-1})$; $Y=(y_0, y_1, \ldots, y_{m-1})$),
   wherein the one or more multiplicative shares are represented as a plurality of additive shares ($X_i=(x_{i,0}, x_{i,1}, \ldots, x_{i,n-1})$; $Y_i=(y_{i,0}, y_{i,1}, \ldots, y_{i,n-1})$),
   a processor circuit, wherein the processor circuit is configured to multiply a first variable of the plurality of variables with a second variable of the plurality of variables to obtain a first value of the multiplying (z=xy) by:
   for each multiplicative share of the first variable, computing a second value of convolution ($Z_i=X_i*Y_i$) of the plurality of additive shares representing the each multiplicative share of the first variable ($X_i$) and the plurality of additive shares representing the plurality of multiplicative shares of the second variable ($Y_i$),
   storing a plurality of the second value of convolution as a plurality of additive shares ($Z_i$) in the memory circuit as a representation in additive shares of at least one multiplicative share of the first value of the multiplying (z).

2. The computation device as in claim 1, further comprising a communication interface, wherein the communication interface is arranged to obtain at least one of the first variable of the plurality of variables and the second variable of the plurality of variables.

3. The computation device as in claim 1,
   wherein the computation device is arranged for the obfuscated execution of a cryptographic operation,
   wherein the cryptographic operation comprises at least an arithmetic operation.

4. The computation device as in claim 3,
   wherein the arithmetic operation comprises at least one multiplication and at least one conditional assignment,
   wherein the processor circuit is configured to assign either the first variable of the plurality of variables (x) to a third variable (z) or the second variable of the plurality of variables (y) to the third variable (z) depending on a binary condition (d),
   wherein the processor circuit is arranged to obtain a first selection number (R) and a second selection number (R') in dependence on the binary condition,
   wherein the first selection number and the second selection number are represented as a plurality of additive shares,
   wherein the processor circuit is arranged to, for each multiplicative share of the first variable, compute a third value of convolution ($R*X_i$) of a first selection number (R) and the plurality of additive shares representing the multiplicative share of the first variable of the plurality of variables ($X_i$),
   wherein the processor circuit is arranged to, for each multiplicative share of the first variable compute, a fourth value of convolution ($R'*Y_i$) of a second selection number (R') and the plurality of additive shares representing the plurality of multiplicative share of the second variable of the plurality of variables ($Y_i$),
   wherein the processor circuit is arranged to, for each multiplicative share of the first variable, add the third value of convolution and the fourth value of convolution ($Z_i=R* X_i+R' *Y_i$) to obtain a fifth value,
   wherein the processor circuit is arranged to store the plurality of the fifth value ($Z_i$) in the memory circuit as a representation in additive shares of a multiplicative share of the third variable (z).

5. The computation device as in claim 4, wherein the first selection number and the second selection number are additive representations of 0 or 1.

6. The computation device as in claim 4, wherein the arithmetic operation comprises a conditional assignment followed by a multiplication with result from the conditional assignment.

7. The computation device as in claim 3,
   wherein the arithmetic operation comprises a first exponentiation,
   wherein the first exponentiation comprises repeated obfuscated multiplications.

8. The computation device as in claim 6,
   wherein the arithmetic operation comprises an exponentiation,
   wherein the exponentiation comprises repeated multiplications,
   wherein the repeated multiplications depend on bits in an exponent,
   wherein a conditional assignment is executed in dependency on the bits in the exponent followed by a multiplication.

9. The computation device as in claim 3,
   wherein the arithmetic operation comprises an exponentiation,
   wherein the exponentiation is executed according to a Montgomery ladder,
   wherein multiplications and conditional assignments in the Montgomery ladder are obfuscated.

10. The computation device claim 9, wherein the Montgomery ladder is implemented according to:

$$s \leftarrow 1$$
$$t \leftarrow h$$
$$\text{For } i = \lambda-1 \text{ to } 0 \text{ do}$$
$$\quad u \leftarrow (1-d_i)s + d_i t \mod N \text{ (I)}$$
$$\quad s \leftarrow su \mod N \text{ (II)}$$
$$\quad t \leftarrow tu \mod N \text{ (II)}$$
$$\text{End for,}$$

wherein h represents base of the exponentiation,
wherein bits $d_i$ represent bits of an exponent,
wherein the conditional assignment (I) and the multiplication (II) are obfuscated.

11. The computation device as in claim 7
wherein the processor circuit is arranged to perform a second exponentiation by obtaining a first exponent and a second exponent,
wherein the first exponent has fewer bits than the second exponent,
wherein the second exponentiation by the first exponent and the second exponent is equal to exponentiation by a product exponent,
wherein the product exponent is equal to the first exponent multiplied by the second exponent,
wherein the exponentiation with the first exponent comprises obfuscated multiplication and/or conditional assignments.

12. The computation device as in claim 1, wherein the additive shares representing multiplicative shares are stored in encoded form.

13. The computation device as in claim 1, wherein the number of multiplicative share is at least one.

14. A computation method for obfuscated execution of a multiplication, the method comprising:
storing plurality of variables,
wherein each variable (x;y) of the plurality of variables are represented as one or more multiplicative shares $(X=(x_0, x_1, \ldots, x_{m-1}); Y=(y_0, y_1, \ldots, y_{m-1})$,
wherein the one or more multiplicative shares are represented as plurality of additive shares $(X_i=(x_{i,0}, x_{i,1}, \ldots, x_{i,n-1}); Y_i=(y_{i,0}, y_{i,1}, \ldots, y_{i,n-1})$ ; and
multiplying a first variable of the plurality of variables with a second variable of the plurality of variables to obtain a first result (z=xy) by:
for each multiplicative share of the first variable, computing a first value of convolution $(Z_i=X_i*Y_i)$ of the plurality of additive shares representing the each multiplicative share of the first variable $(X_i)$ and the plurality of additive shares representing the plurality of multiplicative shares of the second variable $(Y_i)$ ; and
storing a plurality of the first value of convolution as a plurality of plurality of additive shares $(Z_i)$ in the memory circuit as a representation in additive shares of at least one multiplicative share of the first result of multiplication (z).

15. A computer program stored on a non-transitory medium, wherein the computer program when executed on a processor performs the method as claimed in claim 14.

16. The computation device as in claim 5, wherein the arithmetic operation comprises a conditional assignment followed by a multiplication with result from the conditional assignment.

17. The method as in claim 14, further comprising obfuscating execution of a cryptographic operation, wherein the cryptographic operation comprises at least an arithmetic operation.

18. The method as in claim 17, further comprising:
assigning the first variable of the plurality of variables (x) to a third variable (z) or the second variable of the plurality of variables (y) to the third variable (z) depending on a binary condition (d);
obtaining a first selection number (R) and a second selection number (R') in dependence on the binary condition, wherein the first selection number and the second selection number are represented as a plurality of additive shares;
for each multiplicative share of the first variable, computing a second value of convolution $(R*X_i)$ of the first selection number (R) and the additive shares representing the multiplicative share of the first variable of the plurality of variables $(X_i)$;
for each multiplicative share of the first variable, computing a third value of convolution $(R'*Y_i)$ of the second selection number (R') and the plurality of additive shares representing the plurality of multiplicative share of the second variable of the plurality of variables $(Y_i)$;
for each multiplicative share of the first variable, adding the second value of convolution and the third value of $(Z_i, R*X_i+R'*Y_i)$ to obtain a fourth value; and
storing the plurality of the fourth value $(Z_i)$ in the memory circuit as a representation in additive shares of a multiplicative share of the third variable (z),
wherein the arithmetic operation comprises at least one multiplication and at least one conditional assignment.

19. The method as in claim 18, wherein the first selection number and the second selection number are additive representations of 0 or 1.

20. The method as in claim 18, wherein the arithmetic operation comprises a conditional assignment followed by a multiplication with result from the conditional assignment.

* * * * *